United States Patent
Alfarhan

(10) Patent No.: US 8,661,727 B2
(45) Date of Patent: *Mar. 4, 2014

(54) HUMANE ANIMAL TRAP

(76) Inventor: Abdulmajeed F. S. SH. Alfarhan, Mubarak Al Kabir (KW)

(*) Notice: Subject to any disclaimer, the term of this patent is extended or adjusted under 35 U.S.C. 154(b) by 0 days.

This patent is subject to a terminal disclaimer.

(21) Appl. No.: 13/585,182

(22) Filed: Aug. 14, 2012

(65) Prior Publication Data

US 2013/0081322 A1 Apr. 4, 2013

Related U.S. Application Data

(63) Continuation of application No. 13/252,065, filed on Oct. 3, 2011.

(51) Int. Cl.
*A01M 23/32* (2006.01)
*A01K 69/10* (2006.01)
*A01K 69/06* (2006.01)
*A01M 23/24* (2006.01)
*A01M 23/00* (2006.01)

(52) U.S. Cl.
USPC .................................. 43/63; 43/62; 43/105

(58) Field of Classification Search
USPC ........................ 43/63, 62, 100, 105
See application file for complete search history.

(56) References Cited

U.S. PATENT DOCUMENTS

| 36,827 | A | * | 11/1862 | Andrews | 43/62 |
| 49,923 | A | * | 9/1865 | Rex | 43/62 |
| 67,893 | A | * | 8/1867 | Mansfield | 43/62 |
| 79,577 | A | * | 7/1868 | Kohler | 43/62 |
| 85,199 | A | * | 12/1868 | Beach | 43/62 |
| 102,761 | A | * | 5/1870 | Brooks | 43/63 |
| 104,406 | A | * | 6/1870 | Arnold | 43/62 |
| 132,476 | A | * | 10/1872 | Livaudais | 43/105 |
| 141,588 | A | * | 8/1873 | Pavonarius et al. | 43/63 |
| 199,987 | A | * | 2/1878 | McGuire | 43/62 |
| 215,308 | A | * | 5/1879 | Witt | 43/62 |
| 234,004 | A | * | 11/1880 | Dolley | 43/63 |
| 388,196 | A | * | 8/1888 | Harden | 43/62 |
| 411,606 | A | * | 9/1889 | Parker | 43/63 |

(Continued)

FOREIGN PATENT DOCUMENTS

| FR | 2563080 A1 * 10/1985 | A01K 69/06 |
| JP | 2005278584 A * 10/2005 | A01M 23/32 |

OTHER PUBLICATIONS

Prior art cited in parent U.S. Appl. 13/252,065, filed Oct. 3, 2011, the priority of which is claimed herein.

*Primary Examiner* — Darren W Ark
(74) *Attorney, Agent, or Firm* — Richard C. Litman

(57) ABSTRACT

The humane animal trap has a circular base and a plurality of arcuate ribs extending upward and inward therefrom to form a generally hemispherical frame. A hollow central column extends upward from the center of the base. A drop weight is installed within the column. A collapsible net is placed about the base when the trap is set, the weight being connected to the net by tensile members. A mechanically or remotely actuated trigger and actuating mechanism is connected to a weight release mechanism at the top of the column. When an animal enters the open volume defined by the hemispherical frame and trips the mechanism or the trapper actuates the mechanism remotely, the mechanism causes the weight release mechanism to release the drop weight, thereby pulling the net upward and over the arcuate ribs to enclose the hemispherical volume at the lower portion of the trap.

6 Claims, 10 Drawing Sheets

(56) References Cited

U.S. PATENT DOCUMENTS

| | | | | |
|---|---|---|---|---|
| 433,241 A * | 7/1890 | Hawkins, Jr. | | 43/63 |
| 507,086 A * | 10/1893 | Buntain | | 43/63 |
| 560,846 A * | 5/1896 | Donato | | 43/63 |
| 623,870 A * | 4/1899 | Boettcher | | 43/62 |
| 708,380 A * | 9/1902 | Merle | | 43/105 |
| 722,794 A * | 3/1903 | Allen | | 43/62 |
| 755,762 A * | 3/1904 | Gillis | | 43/63 |
| 778,675 A * | 12/1904 | Kerns | | 43/62 |
| 916,677 A * | 3/1909 | Culverhouse | | 43/62 |
| 1,075,954 A * | 10/1913 | Verner | | 43/63 |
| 1,088,477 A * | 2/1914 | De St. Legier | | 43/62 |
| 1,300,981 A * | 4/1919 | Leon | | 43/62 |
| 1,391,489 A * | 9/1921 | Nawracaj et al. | | 43/58 |
| 1,441,442 A * | 1/1923 | Marengo et al. | | 43/63 |
| 1,472,683 A * | 10/1923 | Scheffer et al. | | 43/63 |
| 1,512,641 A * | 10/1924 | Schoening | | 43/75 |
| 1,536,704 A * | 5/1925 | Crago | | 43/63 |
| 1,553,536 A * | 9/1925 | Irvine | | 43/63 |
| 1,601,685 A * | 9/1926 | Fuqua | | 43/59 |
| 1,645,225 A * | 10/1927 | Brzykcy | | 43/74 |
| 1,765,144 A * | 6/1930 | Gibbs | | 43/63 |
| 1,837,650 A * | 12/1931 | Booth | | 43/62 |
| 1,850,182 A * | 3/1932 | Schulke | | 43/63 |
| 1,870,124 A * | 8/1932 | Kasper | | 43/63 |
| 1,881,530 A * | 10/1932 | Hancock | | 43/63 |
| 2,163,827 A * | 6/1939 | Burt | | 43/74 |
| 2,273,008 A * | 2/1942 | Fisher | | 43/68 |
| 2,464,090 A * | 3/1949 | Jordan | | 43/68 |
| 2,536,585 A * | 1/1951 | Titus | | 43/63 |
| 2,682,130 A * | 6/1954 | Schumann, Sr. | | 43/62 |
| 2,707,844 A * | 5/1955 | Ciolli | | 43/62 |
| 2,728,164 A * | 12/1955 | Mears | | 43/105 |
| 2,784,514 A * | 3/1957 | Casson | | 43/105 |
| 2,839,867 A * | 6/1958 | Knutsen | | 43/62 |
| 3,008,261 A * | 11/1961 | Long | | 43/62 |
| 3,508,358 A * | 4/1970 | Lee | | 43/105 |
| 3,596,395 A * | 8/1971 | Clement et al. | | 43/63 |
| 3,903,637 A * | 9/1975 | Dorsey | | 43/105 |
| 4,141,172 A * | 2/1979 | Prosol | | 43/105 |
| 4,156,984 A * | 6/1979 | Kinser, Sr. | | 43/105 |
| 4,373,286 A * | 2/1983 | Robison | | 43/100 |
| 4,434,574 A * | 3/1984 | Benito | | 43/63 |
| 4,447,978 A * | 5/1984 | Robison | | 43/105 |
| 4,774,785 A * | 10/1988 | Fuhrman | | 43/63 |
| 4,791,753 A * | 12/1988 | Fuhrman | | 43/63 |
| 4,831,774 A * | 5/1989 | Gonzalez | | 43/100 |
| 5,024,021 A * | 6/1991 | Wang | | 43/62 |
| 5,842,304 A * | 12/1998 | Rivera | | 43/105 |
| 6,219,959 B1 * | 4/2001 | Hsieh | | 43/59 |
| 6,247,264 B1 * | 6/2001 | Prosol | | 43/105 |
| 6,658,788 B1 * | 12/2003 | Steinfest | | 43/61 |
| 6,732,471 B2 * | 5/2004 | Draper | | 43/62 |
| 7,540,109 B2 * | 6/2009 | Hall | | 43/61 |
| 7,757,427 B2 * | 7/2010 | Bucher | | 43/61 |
| 8,061,076 B2 * | 11/2011 | Kelley | | 43/61 |
| 8,336,250 B2 * | 12/2012 | Kelley | | 43/61 |
| 2010/0154287 A1 * | 6/2010 | Irons | | 43/62 |

* cited by examiner

HUMANE ANIMAL TRAP

CROSS-REFERENCE TO RELATED APPLICATIONS

This is a continuation of my prior application Ser. No. 13/252,065, filed Oct. 3, 2011 now pending.

BACKGROUND OF THE INVENTION

1. Field of the Invention

The present invention relates generally to the fields of hunting and trapping, and more particularly to a humane animal trap that does not result in injury to either a lure animal placed within the trap, or to the captured animal when trapped.

2. Description of the Related Art

The hunting and trapping of various wild and feral animals has been known since the earliest of times. In situations where the animal is to be destroyed, e.g., hunting for food or trapping for the pelt or fur of the animal, little consideration is generally given to injury to the animal. However, it is generally agreed that it is not desirable to have the animal suffer unduly, and in fact, it is generally desirable not to damage the animal any more than necessary, as such damage and injury lowers the value of the animal for its pelt or hide and possibly its food value as well.

However, there are situations in which it is absolutely essential that the animal not be harmed during capture. Examples of such are when capturing an animal for scientific research or study, or when capturing an animal for display in a zoo. In such situations it may be acceptable to render the animal unconscious by means of a tranquilizer gun and dart, but the drugs used may affect the behavior of the animal, even after recovery, and/or some portion of the drugs may linger in the animal's system for some time after. While this may be acceptable in the case of animals being captured for a zoo, it may not be acceptable for an animal being captured for scientific research or study. Moreover, even where traps are used to capture animals, it is nearly universal that different traps must be used to capture birds as opposed to land animals. This, of course, increases the cost and complexity of such trapping operations.

In many cases it is necessary to lure the animal into the trap. While this may be accomplished in many different ways, e.g., an audio recording of a sound or sounds that attract the animal, scents to attract the animal, etc., one of the most effective ways to attract a predator into a trap is to secure live bait or a lure animal in the trap. In many traps, if not most such traps, this results in the death of the lure animal after the predator has been lured into the trap and captured. This is clearly not a desirable outcome for those who seek the humane treatment of the animals involved.

Thus, a humane animal trap solving the aforementioned problems is desired.

SUMMARY OF THE INVENTION

The humane animal trap provides for the humane, non-injurious capture of both land animals and birds. The trap comprises a circular base having a plurality of arcuate ribs extending upward therefrom to a central point, forming a generally hemispherical framework. A net is gathered peripherally about the base when the trap is set, leaving the hemispherical framework open for entry of animals therein. A small cage or enclosure is provided for bait or a lure animal, e.g., a pigeon, squirrel, or other prey-type animal, the cage or enclosure protecting the lure animal from harm when a predator is captured within the trap.

A hollow central column extends upward from the center of the base, the column having a drop weight or counterweight therein. The drop weight is connected to the net, and pulls the net upwardly and inwardly over the arcuate frame members to form a generally hemispherical enclosure when the trap is sprung. The trigger mechanism comprises a small pin held loosely between a pair of trigger plates installed about the central column. The small pin holds a spring-loaded release link in place. The release link is connected to a wire or the like that is, in tarn, connected to a weight release. A plurality of perches, and in an alternative embodiment, a plurality of treadle plates are connected to the trigger plates by corresponding wires or other suitable connectors. When a bird alights on one of the perches, or alternatively, when an animal steps on one of the treadle plates, its link to one of the trigger plates tilts the trigger plates relative to one another to cause the small pin to be pulled from the trigger plates by the spring-loaded release link. The release link is therefore freed to actuate the weight release. The drop weight is accordingly released from its armed position in the upper end of the column, falling to pull the net upward and inward over the ribs to enclose the hemispherical volume in the lower portion of the trap to capture the animal within the net.

Alternatively, the trap may be sprung or released remotely by a trapper observing the trap from a concealed or remote location. A radio receiver or the like may be installed within the lower portion of the trap. The receiver operates an escapement, servo, relay, or other suitable mechanism that is, in turn, connected mechanically to the trigger plates. When the trapper transmits a signal to the receiver, the receiver actuates the release device (servo, etc.) to misalign the trigger plates relative to one another to operate the drop weight mechanism, as described further above. In another alternative embodiment, the central column extends below the base of the device, and the lower end or portion of the central column is buried in the ground to provide better security for the device. Also, a spring may be provided in the upper end of the column to provide an initial down force to the weight, thereby accelerating the weight more rapidly than would be the case by gravitational force alone.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The humane animal trap provides for the live capture of an animal(s) therein, without injury to the animals. While a lure or a bait animal may be used in the trap to entice a predator to enter, the lure or bait animal is also protected within its cage in the trap, so no harm can befall either the hire or bait animal, or the animal that becomes entrapped within the humane animal trap.

Figure 1:
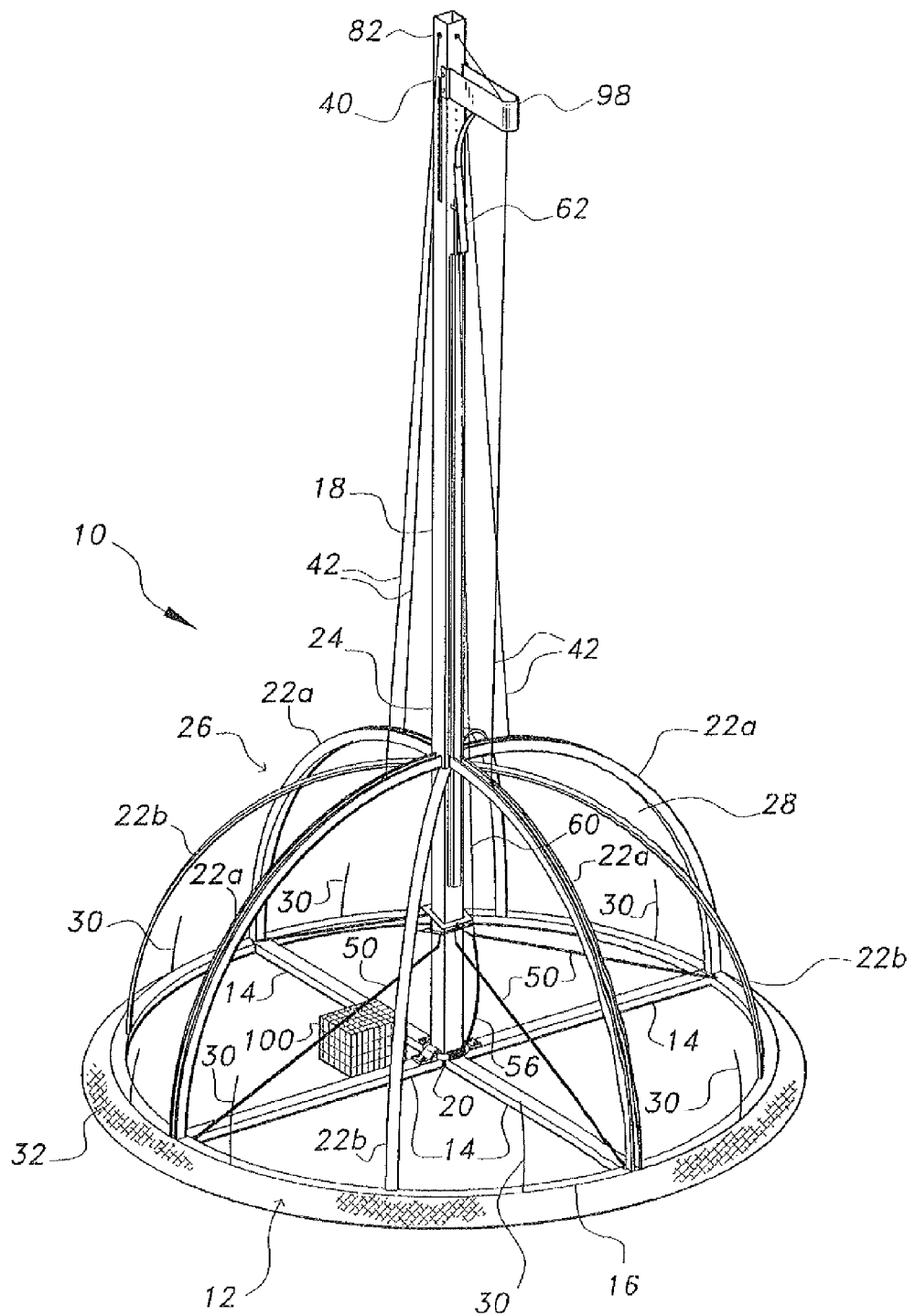
FIG. 1 is a perspective view of a humane animal trap according to the present invention, showing the trap set and the net lowered.
Figure 2:
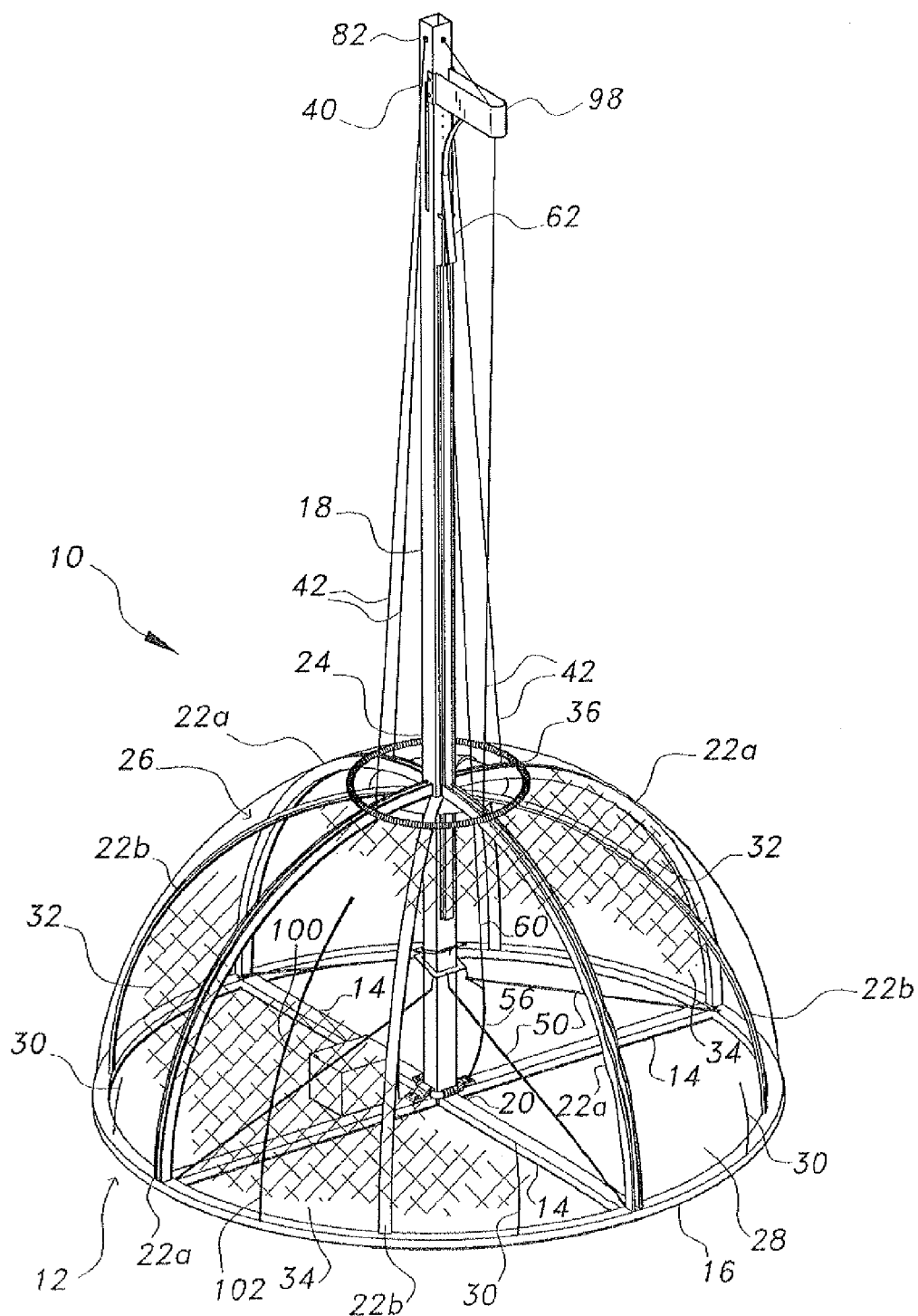
FIG. 2 is a perspective view of the humane animal trap according to the present invention, showing the trap of FIG. 1 with its net raised after tripping the trap.

FIGS. 1 and 2 of the drawings respectively illustrate the deployed humane animal trap 10. FIG. 1 shows the trap 10 armed and FIG. 2 shows the trap 10 after it has been tripped. The trap 10 comprises a base 12 formed of a plurality of radially extending members 14 and a rigid peripheral member 16 disposed thereabout. A hollow column 18 extends upwardly from the center 20 of the base 12. A counterweight or drop weight (illustrated in subsequent drawings) is disposed within the column 18 and functions as described further below. A plurality of rigid arcuate ribs 22a, 22b are attached to the generally medial portion 24 of the column 18 and extends downward and outward to attach to the peripheral member 16. The circular peripheral member 16 and the ribs 22a, 22b form a rigid hemispherical frame 26 defining a trap volume 28. The ribs 22a, 22b are of two different types. Ribs 22a have external channels serving as tracks to guide the net-erecting tensile members (cords, cables, etc., shown in further detail in subsequent drawings), ribs 22b serve to further define the hemispherical shape of the frame 26. A short intermediate stay 30 may be provided, the stay 30 extending upward from the peripheral member 16 between each of the ribs 22. A net 32 is disposed about the peripheral member 16, and has a lower edge 34 (FIG. 2) attached to the peripheral member 16 and an opposite upper edge 36 (FIG. 2) drawn up and over the ribs 22 to enclose the trap volume 28 when the trap 10 is tripped.

Figure 9:
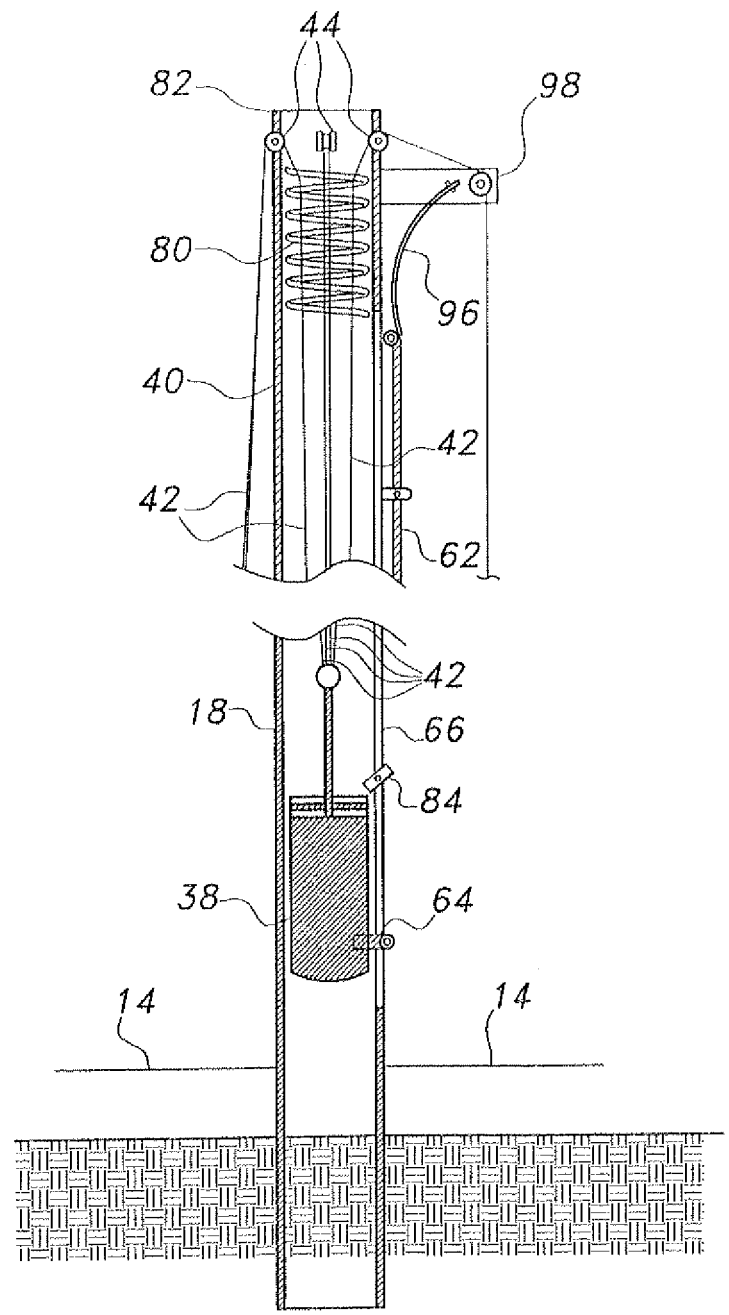
FIG. 9 is an elevation view in section of the column of a humane animal trap according to the present invention, showing an alternate embodiment wherein the column is anchored in the ground, and further showing the drop weight after release and further details of the mechanism.
Figure 10:
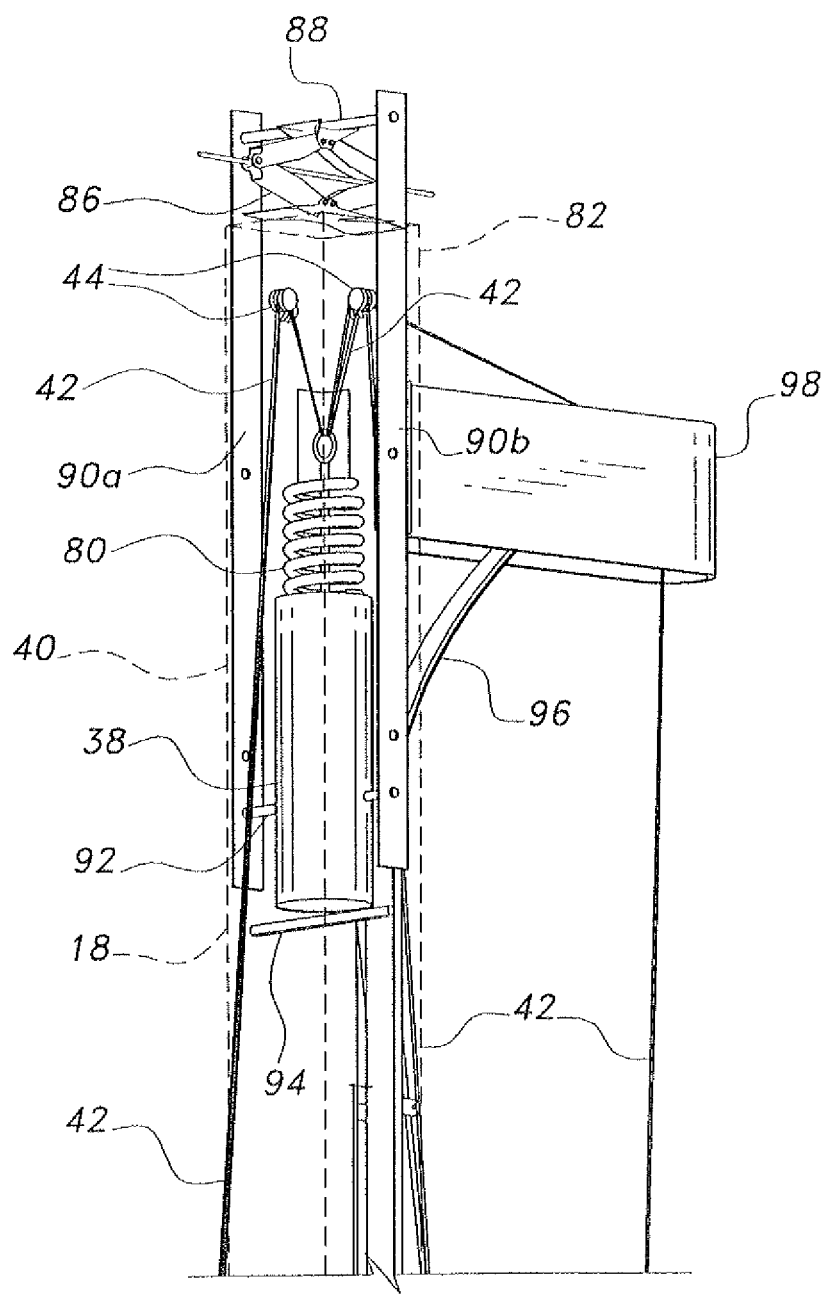
FIG. 10 is a partial perspective view in section of the upper column of the humane animal trap of FIG. 1, showing details of the mechanism for lifting and securing the drop weight when readying the trap for use.

FIGS. 9 and 10 of the drawings illustrate the drop weight 38 that is used to draw the net 32 up and over the ribs 22a, 22b to enclose the trap volume 28 when the trap 10 is tripped. The drop weight 38 is disposed within the hollow central column 18. The weight 38 is shown at or near the bottom of its travel in FIG. 9 after the trap has been tripped, and is shown in an armed position in the upper portion 40 of the column 18 (shown in broken lines in FIG. 10) when the trap 10 is ready to be sprung for the capture of an animal. The weight 38 is connected to a series of tensile members 42 (e.g., cords, light, flexible cables, etc., also shown in FIGS. 1, 2, and other drawings) that extend from the top of the weight 38 and upward over corresponding upper pulleys or guides 44 in the top 40 of the column 18. (One of the tensile members 42 is displaced outward from the upper portion 40 of the column 18 to provide clearance for the weight release mechanism.) The tensile members 42 then extend generally downward outside the column 18 to pass through or beneath corresponding lower pulleys or guides 45 installed atop each of the ribs 22a adjacent the column 18, most clearly shown in FIG. 6, and extend to the upper edge 36 of the net 32. When the net 32 is positioned about the peripheral member 16 of the base 12, the tensile members 42 extend outward and downward in channels disposed along the outer surfaces of the ribs 22a. Thus, when the weight 38 drops inside the hollow column 18, it draws the adjacent portions of the tensile members 42 downward within the column, thereby drawing the distal portions of the tensile members upward outside the column 18 and along the ribs 22a to draw the upper edge 36 of the net 32 upward and inward along the ribs 22a and 22b toward the medial portion 24 of the column 18, so that the net 32 encloses the trap volume 28 within the frame 26.

Figure 3:
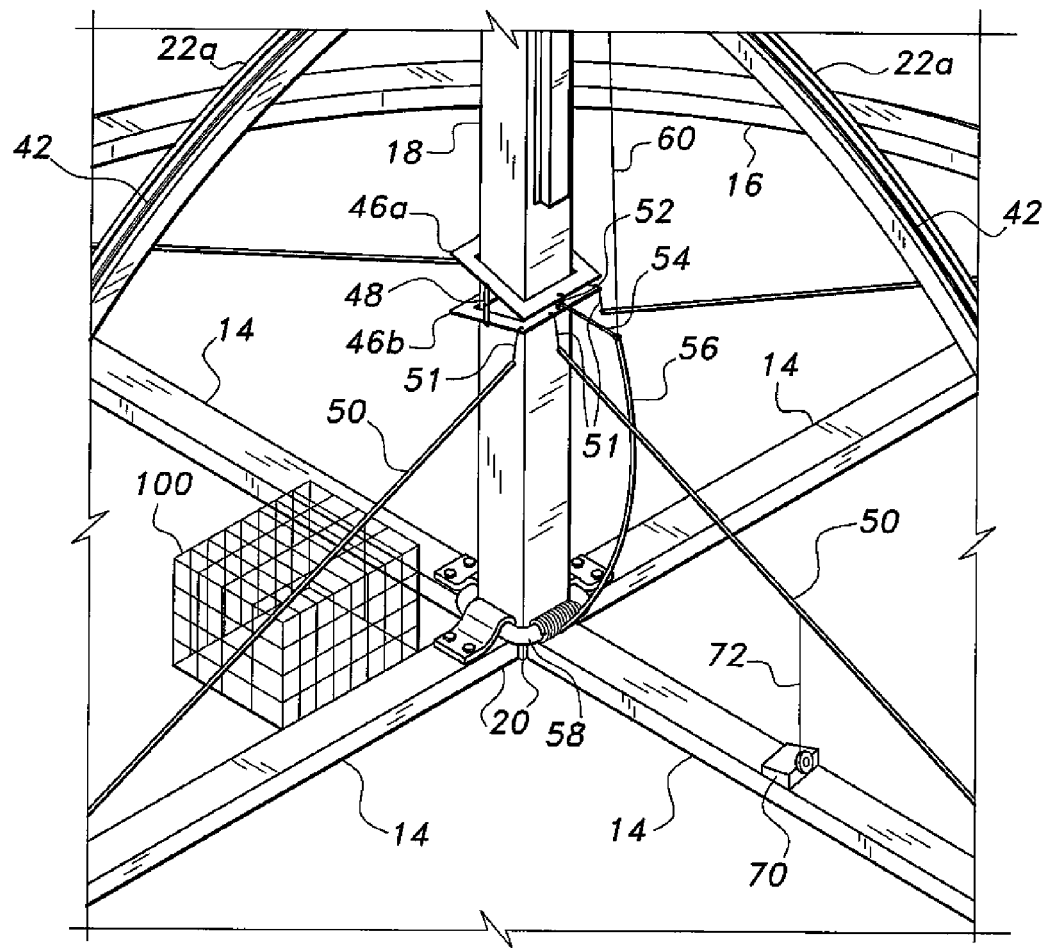
FIG. 3 is a partial perspective view of the human animal trap of FIG. 1, showing details of the center of the base and the trigger mechanism.
Figure 4:
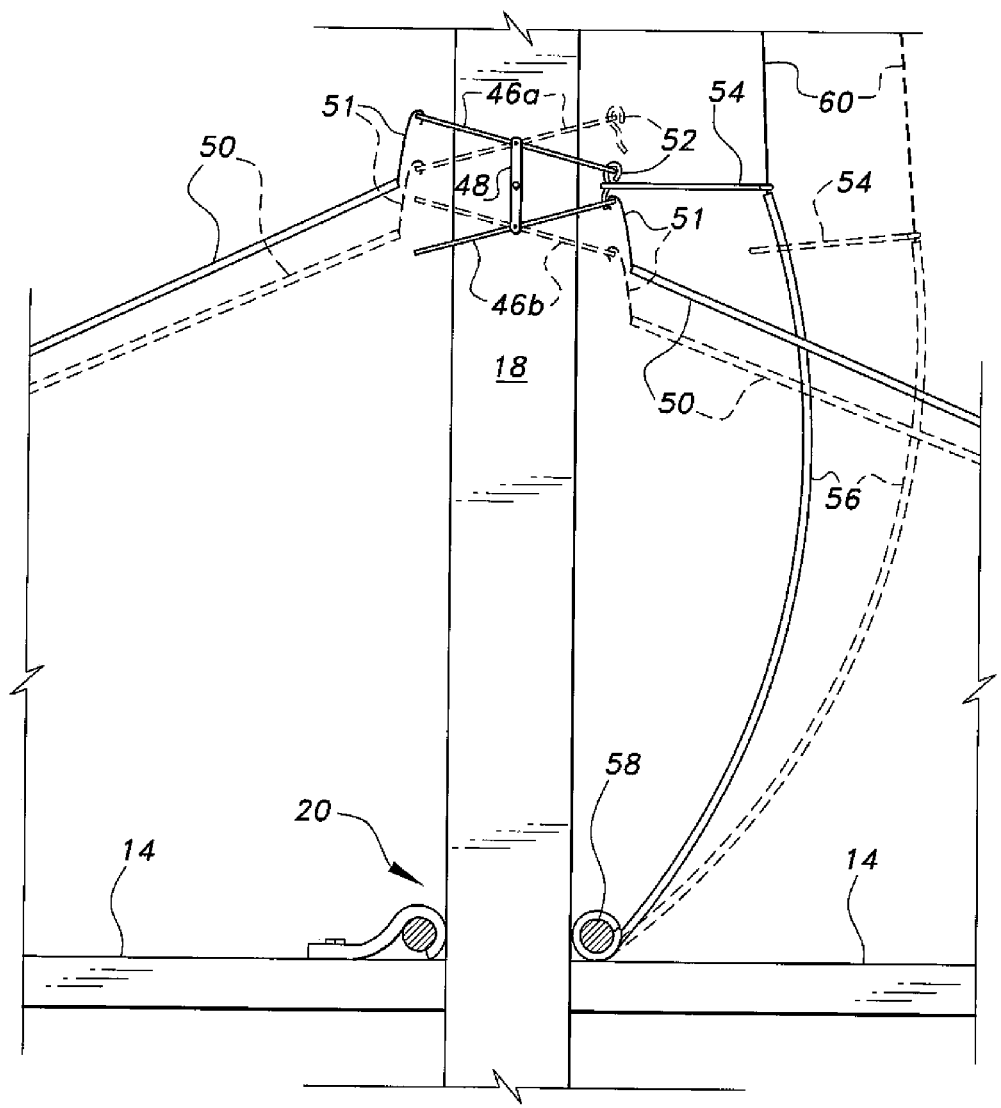
FIG. 4 is a partial elevation view of the human animal trap of FIG. 1 showing further details of the trigger mechanism.

The lower portion of the weight release mechanism is most clearly shown in FIGS. 3 through 6 of the drawings. First and second (or upper and lower) trigger plates, respectively 46a and 46b, are disposed one above the other about the central column 18 between the radial members 14 of the base 12 and the junction between the ribs 22a, 22b and the column 18. The trigger plates 46a, 46b are attached to the column 18 by two opposed pivot links 48 that extend from opposite sides of the column 18. While only one of the pivot links 48 is illustrated in FIGS. 3 and 4, it will be understood that this mechanism is laterally symmetrical, one such pivot link 48 being on each of the opposite sides of the column 18. The first or upper trigger plate 46a pivots laterally about the upper ends of these two pivot links 48, and the second or lower trigger plate 46b pivots laterally about the opposite lower ends of the pivot links 48. The two trigger plates 46a, 46b are free to rock or pivot independently of one another upon the two pivot links 48.

Figure 5:
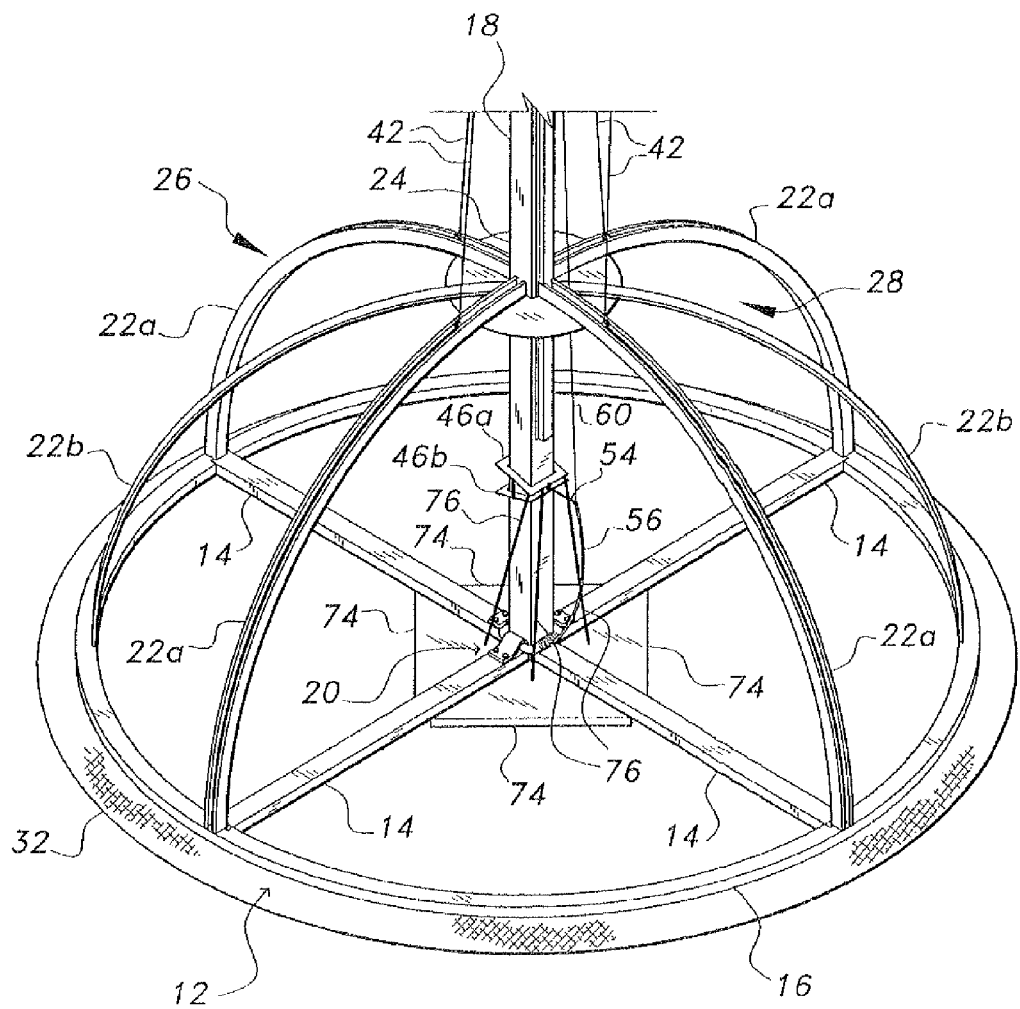
FIG. 5 is a partial perspective view of a humane animal trap according to the present invention, showing an alternative addition to the trigger mechanism.
Figure 6:
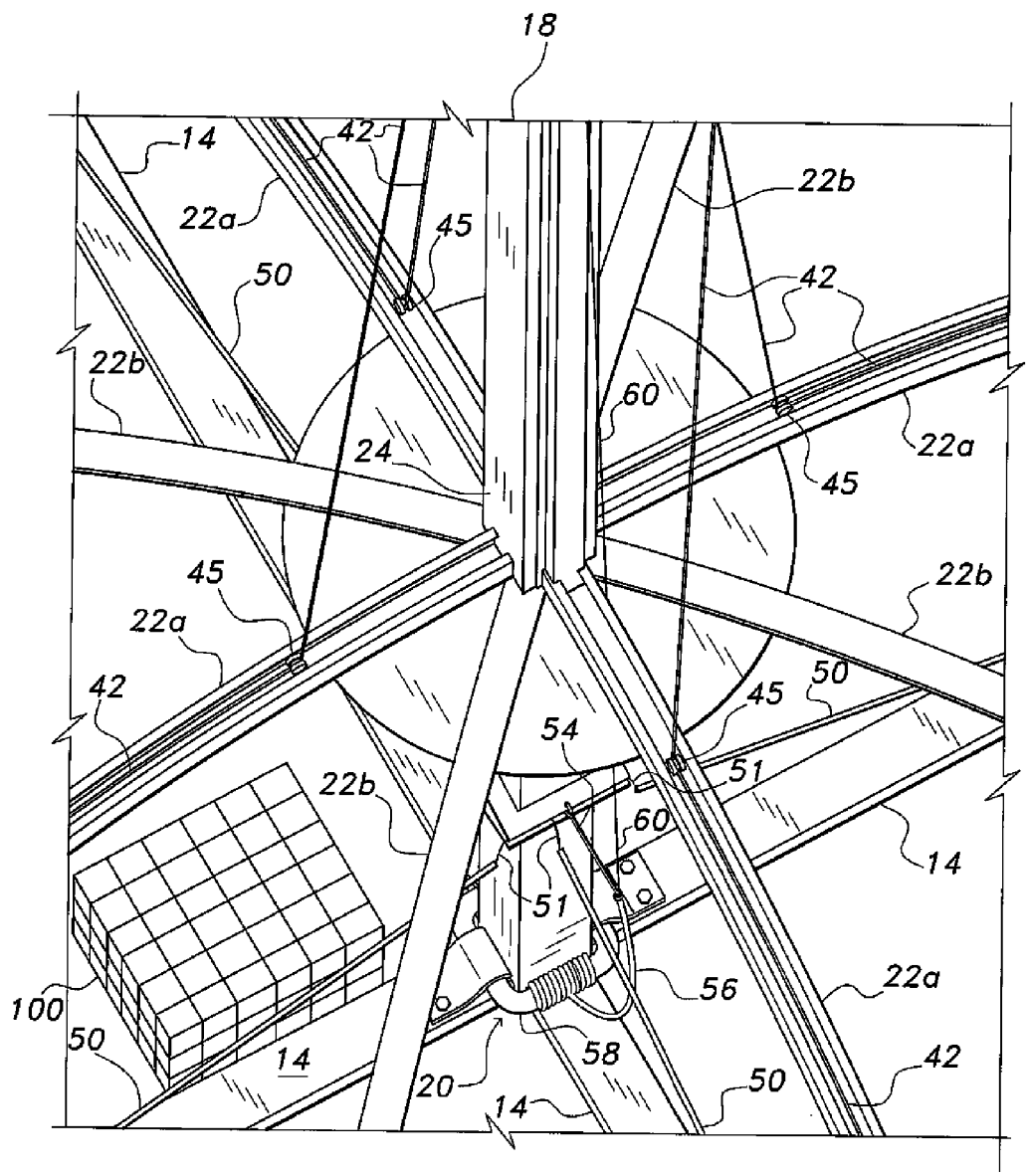
FIG. 6 is a partial perspective view of the humane animal trap of FIG. 1 taken just above the hemispherical frame, showing details of the net raising lines.

When the trap 10 is set, the two trigger plates 46a, 46b are oriented generally as shown in FIGS. 4 through 6 (in solid lines in FIG. 4). Various triggering means may be connected to the trigger plates 46a, 46b to spring the trap 10. In FIGS. 1 through 4 and FIG. 6, a plurality of perches 50 are shown extending between the peripheral member 16 and the higher edge of either of the two trigger plates 46a or 46b, depending upon the side of the trap to which they are positioned. It will be seen, particularly in FIG. 3, that three of the perches 50 are secured to the high side of the second or lower trigger plate 46b via a respective link 51, and a fourth perch 50 is secured to the high side of the first or upper trigger plate 46a via a link 51. The perches 50 are loosely pivotally attached at the peripheral member 16, and also to their respective trigger plates 46a and 46b via the respective links 51. It will be seen, particularly in FIG. 4. that if a perch 50 is deflected downward, as by a bird alighting on the perch or perhaps by a land animal stepping over the perch, that perch 50 will pull down on the raised edge or side of the respective trigger plate 46a or 46b to which it is attached, causing that edge or side to pivot downwardly. In the example of FIG. 4, it will be seen that downward movement of the right side perch 50 (shown in broken lines in FIG. 4) will result in the corresponding right side of the second or lower trigger plate 46b, to which it is hooked, pivoting downward, away from the overlying edge of the upper trigger plate 46a. Conversely, downward movement of the left side perch 50 (also shown in broken lines in FIG. 4) will pull the left side of the upper trigger plate 46a downward, resulting in the opposite right edge of the upper plate 46a moving away from the underlying edge of the lower plate 46b. Thus, any downward movement of any of the perches 50 results in the closely adjacent right sides or edges (as shown in FIG. 4) of the two trigger plates moving away from one another.

It will be noted particularly in FIG. 4 that a short pin 52 is loosely installed through holes in the closely adjacent right sides of the two trigger plates 46a and 46b. The pin 52 is held in place frictionally, so that any movement of the two trigger plates 46a, 46b relative to one another results in the pin 52 falling from at least one of the holes in the right sides of the two trigger plates 46a and 46b. The pin 52 is biased outward from its position between the two trigger plates 46a, 46b by a spring-loaded release link 54 attached to the pin 52. The release link 54 is urged outward and away from the two trigger plates 46a, 46b by a spring arm 56 extending from the bracket 58 that secures the radial members 14 to the base of the column 18. When the right sides of the two trigger plates 46a, 46b are spread apart from one another, as shown in broken lines in FIG. 4, the pin 52 pops loose from its position between the two trigger plates 46a, 46b to allow the spring arm 56 to spring outward and downward (as shown in broken lines in FIG. 4) from its normal position (shown in solid lines in FIG. 4) when the trap 10 is set.

The above-described motion of the spring arm 56 draws a weight release line 60 (e.g., cable, cord, etc.) downward to actuate the upper portion of the weight release mechanism, illustrated in FIGS. 7 through 10 of the drawings. (In FIG. 6, the weight release line 60 is shown passing through the gusset plate that secures the ribs 22a and 22b to the medial portion 24 of the column 18. A passage, not shown due to the orientation of FIG. 6, is provided through the gusset plate for the release line 60.) A weight release arm 62 is pivotally attached to the upper portion 40 of the column 18, the weight release line 60 being connected to the lower end of the weight release arm 62. The downward pull of the weight release line 60 by the action of the spring arm 56 draws the lower end of a weight release arm 62 inward towards the column 18, thus causing the opposite upper end of the weight release arm 62 to pivot outward away from the column 18. This part of the operation is shown most clearly in FIGS. 8A and 8B of the drawings. In FIG. 8A, the trap 10 is set, i.e., awaiting an animal to enter the trap and spring the triggering means (e.g., perches 50, etc.) to cause the weight 38 to drop, thereby pulling the net 32 upwardly over the frame 26 to close the trap. The weight 38 has a catch 64 extending radially therefrom, the catch 64 extending through a slot 66 in the side of the column 18. The slot 66 extends for substantially the entire length of the column 18, sufficiently far to allow for full travel of the weight 38 within the column 18. When the trap 10 is set, as shown in FIG. 8A, the upper end of the weight release arm 62 is positioned inwardly to support the outer end of the arm 64. However, when the weight release arm 62 is pivoted about its attachment to the column 18 by a pull from the weight release line 60, as described further above, the upper end of the weight release arm 62 is pivoted outward and away from the column 18, thereby releasing the distal end of the catch 64 from its resting point atop the upper end of the weight release arm 62. Roller bearings 68 or other friction reducing means may be provided either at the upper end of the weight release arm 62 and/or the distal end of the catch 64. When the weight 38 is released from its suspension by the weight release arm 62, it falls inside the column 18, drawing the tensile members 42 up and over the pulleys 44 at the upper portion 40 of the column 18, thereby drawing the net 32 upward and over the frame 26 to close the trap 10.

The actuation of the trap 10 by the perches 50 has been described in detail further above. However, the trap 10 may be actuated by alternative means as well. One such alternative allows a trapper to actuate the trap 10 by a remote signal, according to the desires of the trapper. For example, the trap 10 may be configured for trapping a bird or a land animal when the bird or land animal enters the trap. The trapper may send a radio (or infrared, etc.) signal to the trap 10 using a conventional transmitter (not shown), and a conventional receiver and servo (or escapement, relay, etc.) may be provided in the trap 10 to trip the trigger mechanism. Such a system is illustrated in FIG. 3 of the drawings, in which a receiver and servo (or other actuator) device 70 is shown attached to one of the radial members 14 of the base 12. An actuator connector line 72 (e.g., cord, wire, or other tensile member) extends from the actuator to one of the perches 50. When the receiver 70 receives a signal from the remote transmitter operated by the trapper, the actuator (servo, etc.) moves (e.g., rotates, etc.) to draw the actuator connector line 72 downward, thereby drawing the perch 50 downward just as if a bird had alighted on the perch. The trap is thus tripped and operates in the manner described further above.

FIG. 5 illustrates another alternative means for tripping the trap 10. In FIG. 5, a plurality of treadle plates 74 are placed within the base 12. A treadle connector line 76 extends from each treadle plate 74 up to the corresponding trigger plate 46a or 46b, depending upon which side of the assembly the treadle plate 74 is located. The treadle plates 74 are suspended slightly above the underlying surface, but are very lightweight so that their weight does not move the trigger plates 46a, 46b to trip the trap 10. However, when an animal enters the periphery 16 of the trap 10 and steps on one of the treadle plates 74, the weight of the animal deflects the plate 74 downward, thus pivoting one of the trigger plates 46a or 46b relative to the other to allow the pin 52 to be dislodged from its armed position therebetween, tripping the trap 10 to raise the net 32. Alternatively, the perches 50 may remain installed in the trap 10 along with the treadle plates 74, and the treadle connector lines 76 may extend from the treadle plates 74 to corresponding ones of the perches 50. Depression of one of the treadle plates 74 will thus deflect the corresponding perch 50 downward to trip the trap 10 mechanism.

The trap 10 may be deployed in virtually any location where there is sufficient room. For example, the trap 10 may be used in crowded urban areas, e.g., on rooftops, etc., where it is impossible to use firearms or other missiles (tranquilizer darts, etc.) to capture or destroy animals. The flat base 12 of the trap 10 allows it to be deployed upon any firm surface without the need to penetrate the ground. However, FIG. 9 illustrates an alternative embodiment wherein the column 18 includes a lower ground anchor end 78 that extends below the base and its radial members 14. In this embodiment, a hole is dug in the surface (or the column 18 is driven into the surface, if this may be accomplished without damage to the column) to anchor the trap 10. In this manner, the trap 10 is immobilized, even if a larger animal is trapped therein that would otherwise move the trap 10 while trying to escape.

FIGS. 9 and 10 also illustrate the compression spring 80 that may be installed within the upper end 82 of the column 18, to assist the drop weight 38 in its initial downward movement. The drop weight 38 would otherwise receive all of its downward acceleration solely due to gravity, but some of that acceleration may be impeded by the friction inherent in the mechanism as the tensile members 42 travel through their various pulleys and guides and the net 32 is drawn upward over the ribs 22a and 22b. Accordingly, after reaching the spring 80, the drop weight 38 is pushed further upward to bear against and compress the spring 80. When the trap 10 is tripped, the spring 80 adds to the initial down force provided by gravity to accelerate the drop weight 38 to a greater extent than would be provided by gravity alone, thereby raising the net 32 more rapidly than would otherwise be the case.

FIG. 10 of the drawings provides an illustration of the means used to position the drop weight 38 in the upper end 82 of the column 18. The discussion below also describes the deployment and setting of the trap 10. The trap 10 is initially deployed by extending the radial members 14 from the base bracket 58 at the lower end or portion of the column 18. The radial members 14 may pivot about the bracket 58 to facilitate disassembly and more compact storage of the trap 10, if desired. The peripheral member 16 is then installed at the distal ends of the radial members 14, and the ribs 22a, 22b are installed.

The drop weight 38 will normally be positioned at some point toward the lower end or portion of the column 18 when the column is raised to vertical, generally as shown in FIG. 9 of the drawings. A latch 84 is provided in the lower portion of the column 18 to prevent the weight 38 from being raised if an animal were to pull the top of the net 38 open and away from the column 18 while attempting to escape after being captured. The trapper may release the latch 84 and draw the drop weight 38 upward in the column 18. The trapper may raise the drop weight 38 by working the net 32 downward along the ribs 22a and 22b to its ready position at the base of the ribs 22a, 22b about the peripheral member 16 if some other means is not used to lift the drop weight 38.

Figure 7:
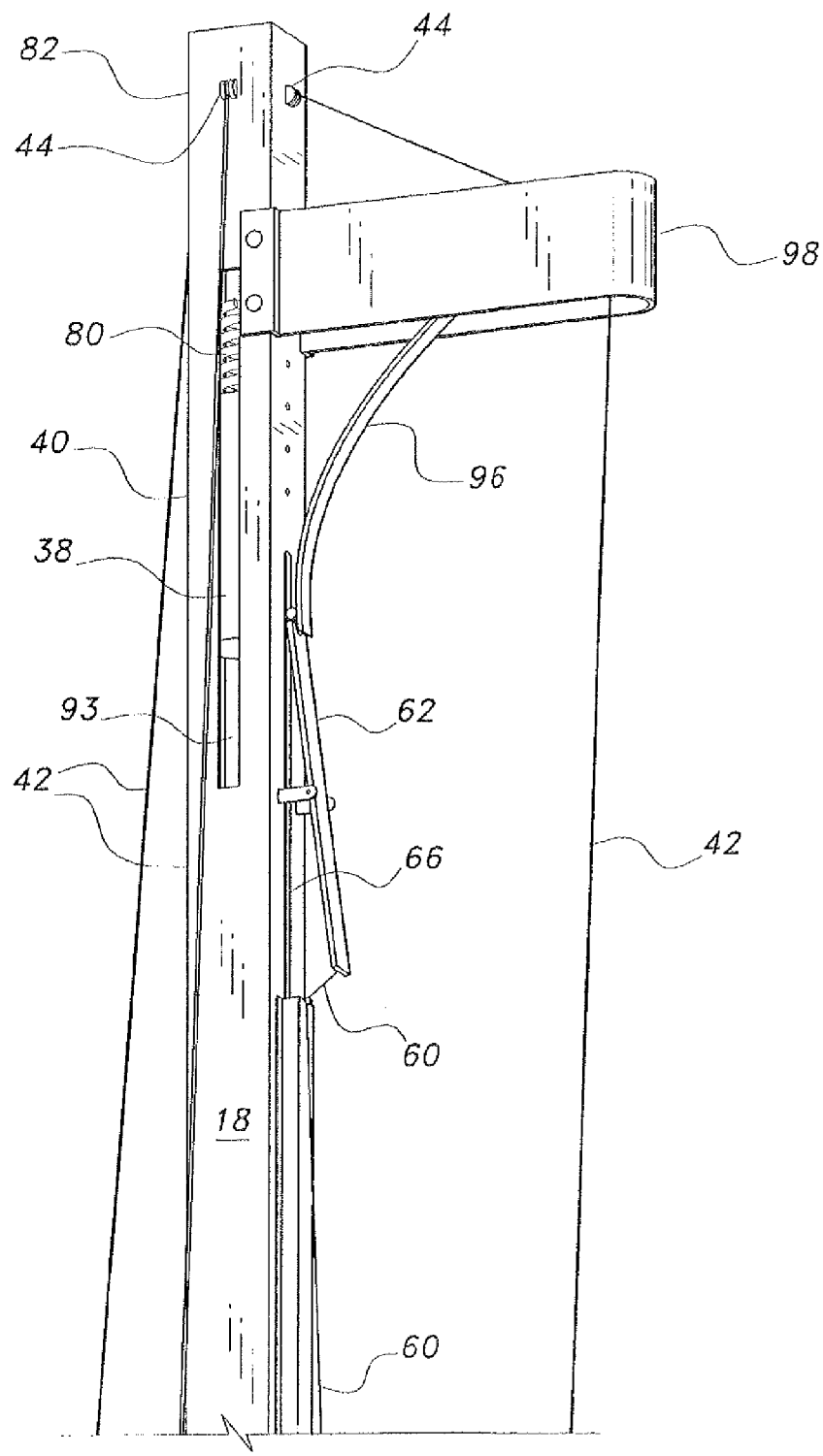
FIG. 7 is a partial perspective view of the humane animal trap of FIG. 1, showing the upper portion of the center column and various details of the weight release mechanism.

Some assistance is required, or at least highly desirable, to urge the weight 38 against the spring 80 in the top of the column 18 to the final set position for the weight 38. This is illustrated in FIG. 10. A jack or the like, e.g., the scissor jack 86 illustrated, is placed atop the column 18 and a lifting bar 88 is placed thereacross. Two opposed lifting straps 90a and 90b are suspended from the lifting bar 88 and extend along opposite sides of the upper portion 40 of the column 18 (shown in broken lines in FIG. 9). A transverse drop weight pin 92 is installed through the weight 38, the pin 92 passing through opposed slots 93 (one of which is shown in FIG. 7) in the sides of the column 18. These slots 93 for the drop weight pin 92 are in the faces of the column 18 at 90° to the catch clearance slot 66, shown in FIGS. 7, 8A, 8B, and 9. The ends of the drop weight pin 92 pass through corresponding holes in the lower ends of the two lifting straps 90a, 90b to complete the drop weight lifting assembly.

Figure 8A:
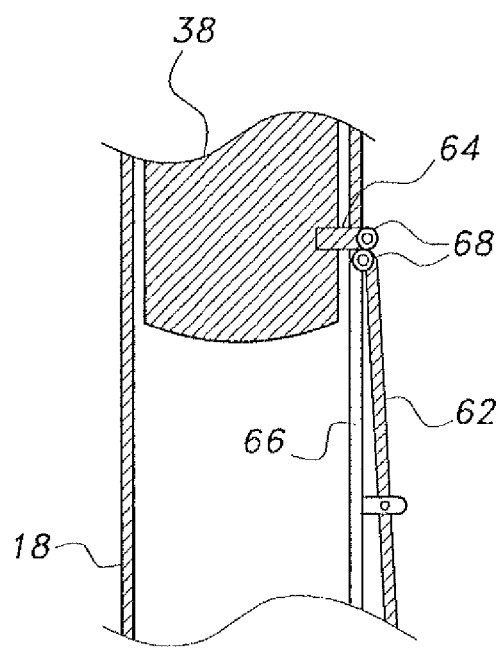
FIG. 8A is a partial elevation view in section of the upper portion of the column of the humane animal trap of FIG. 1, showing the mechanism for suspending the drop weight in readiness for release.
Figure 8B:
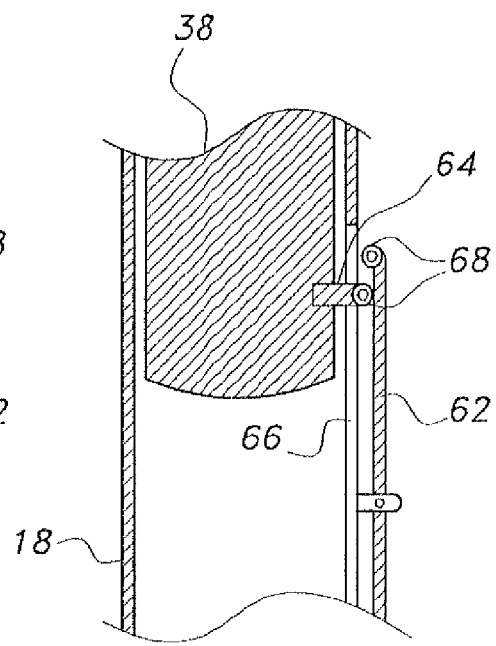
FIG. 8B is a partial elevation view in section of the upper portion of the column of the humane animal trap of FIG. 1, showing the weight release mechanism immediately after being tripped to release the drop weight.

At this point, the jack 86 is operated to pull the drop weight 38 upward against the spring 80, thereby compressing the spring 80 for the purpose of adding initial downward force to the weight 38 when the trap 10 is tripped. When the drop weight 38 has been lifted in the upper portion 40 of the column 18 to its set position, as shown in FIGS. 7 and 8A, a safety pin or rod 94 is temporarily installed across the column 18 beneath the drop weight 38 to assure that the weight 38 will not fall while the remainder of the trap mechanism is being set. This safety pin or rod 94 is later removed, once the trap setting mechanism has been set.

When the drop weight 38 has been positioned and temporarily secured, as described above, the tensile members 42 that draw the net 32 over the ribs 22a, 22b when the trap 10 is sprung will be at their fully extended lengths to allow the net 32 to drop from its deployed position over the ribs 22a, 22b of the frame 26. The net 32 can then be positioned about the peripheral member 16 at the base of the ribs 22a, 22b, generally as shown in FIG. 1 of the drawings. Thus, the trapper has complete access to the lower portion of the weight release mechanism and may then set this mechanism by orienting the two trigger plates 46a and 46b generally as shown in FIGS. 3, 4 (in solid lines in FIG. 4), and 5, and install the pin 52 therebetween. This draws the release link 54 and the spring arm 56 upward and inward toward the column 18, allowing the weight release line 60 to extend to its set position to the outwardly disposed lower end of the weight release arm 62.

Once the above operation has been accomplished, the upper end of the weight release arm 62 is positioned beneath the catch 64 that extends from the weight 38 through the slot 66 in the side of the column 18, generally as shown in FIG. 8A, thereby holding the weight 38 in its armed position awaiting release. A leaf spring 96 extends downward and inward from the offset bracket 98 extending from the upper portion or top of the column 18. The bracket 98 also reroutes the path of the tensile member 42 that would otherwise interfere with the weight release arm 62 and its weight release line 60. The leaf spring 96 provides slight pressure against the upper end of the weight release arm 62, urging it inward toward the weight 38 to assure that the weight remains in place in the upper portion or end of the column 18 until the trap 10 is positively tripped.

The final step in setting the trap 10 occurs when the trapper installs some bait or lure means within the trap. A cage 100 containing a live lure or bait animal, e.g., rabbit, squirrel, dove, pigeon, etc., may be placed at any convenient location within the area defined by the peripheral member 16 of the frame assembly 26 at this time. The lure or bait animal cage 100 may be anchored within the periphery 16 of the trap 10, but this is not absolutely required. Alternatively, some other lure, e.g., raw meat, may be used without the need for the cage 100. Any safety components previously installed, e.g., the safety pin or rod 94 shown in FIG. 10, may be removed at this point to complete the trap-setting procedure.

The trap 10 is sprung, as described further above, e.g., by a bird alighting upon and deflecting one of the perches 50 downward, an animal stepping upon one of the treadle plates 74, or by the trapper transmitting a signal to the receiver and actuator 70 within the trap. Regardless of the means used to spring the trap 10, when the trap is sprung, the drop weight 38 is released, thereby drawing the net 32 upward over the ribs 22a, 22b to close about the medial portion 24 of the column 18 to enclose the trap volume 28 within the frame 26. The trapper may then approach the trap and withdraw the trapped animal therein by means of a zipper 102 (shown in FIG. 2) or other selectively operable fastener provided in the side of the net 32, thereby precluding any requirement to open the net 32 completely and providing the trapped animal with a greater opportunity for escape.

It is to be understood that the present invention is not limited to the embodiments described above, but encompasses any and all embodiments within the scope of the following claims.

I claim:

1. A humane animal trap, comprising:
a base having a periphery and a center;
an elongate, hollow center column extending upward from the center of the base, the center column having an upper end and a lower end;
a net having an upper edge and a lower edge, the lower edge extending around and attached to the periphery of the base;
a plurality of ribs extending between the periphery of the base and the center column, the base and the ribs defining a frame;
a drop weight disposed within the hollow center column;

a trigger mechanism connected between the frame and the drop weight, the trigger mechanism including at least one trigger pivotal between a set position and a triggered position and a linkage coupling the at least one trigger to the drop weight; and a cable and pulley mechanism having a plurality of cables extending between the drop weight and the upper edge of the net;

wherein the drop weight is at the upper end of the column and the net is collapsed around the periphery of the base when the at least one trigger is in the set position, the drop weight falling towards the lower end of the column and the cables raising the net so that the net extends over the ribs and towards the center column to entrap an animal in the frame when the at least one trigger is in the triggered position.

2. The humane animal trap according to claim 1, wherein the periphery of the base is circular and the ribs are arcuate, the periphery of the base, the ribs, and the net defining a substantially hemispherical trap when the at least one trigger is in the triggered position.

3. The humane animal trap according to claim 1, wherein said at least one trigger comprises a plurality of perches extending radially between the periphery of said base and the center column, the perches being pivotally attached to the periphery.

4. The humane animal trap according to claim 1, wherein said trigger mechanism comprises:
   a pair of plates disposed around said center column, the plates being pivotally attached to each other, the plates having aligned holes defined therein;
   a release pin removably extending through the aligned holes;
   a release link extending from the release pin;
   said linkage coupling the at least one trigger to the drop weight comprising a link connecting said at least one trigger to one of the plates;
   a spring arm attached to the center of said base, the spring arm having an upper end, the release link being attached to the upper end of the spring arm, the upper end being biased to extend outward from the center column;
   a weight release arm pivotally attached to the upper end of said center column, the weight release arm having a stop extending therefrom;
   a catch extending from the drop weight, the catch extending through said center column; and
   a cable extending between the upper end of the spring arm and the weight release arm;
   wherein, the stop is disposed beneath the catch when the at least one trigger is in the set position, the plates being pivoted away from each other when the at least one trigger moves to the triggered position, thereby releasing the release pin, the spring arm moving outward and pivoting the weight release arm to move the stop from beneath the catch, permitting the drop weight to fall.

5. The humane animal trap according to claim 1, further comprising a bait cage disposed on said base for protecting a lure animal.

6. The humane animal trap according to claim 1, wherein the plurality of ribs have guide channels defined therein, the plurality of cables in said cable and pulley mechanism extending through the corresponding guide channels to pull said net closely over the plurality of ribs.

* * * * *